(12) United States Patent
Nattermann et al.

(10) Patent No.: US 12,115,979 B2
(45) Date of Patent: Oct. 15, 2024

(54) METHOD AND CONTROL DEVICE FOR A SYSTEM FOR THE CONTROL OF A MOTOR VEHICLE

(71) Applicant: ZF Friedrichshafen AG, Friedrichshafen (DE)

(72) Inventors: Till Nattermann, Krefeld (DE); Christian Wissing, Wesel (DE); Manuel Schmidt, Dortmund (DE); Andreas Homann, Dortmund (DE); Torsten Bertram, Düsseldorf (DE); Niklas Stannartz, Dortmund (DE); Christian Lienke, Dortmund (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 162 days.

(21) Appl. No.: 16/921,976

(22) Filed: Jul. 7, 2020

(65) Prior Publication Data
US 2021/0009119 A1     Jan. 14, 2021

(30) Foreign Application Priority Data
Jul. 8, 2019   (DE) ..................... 10 2019 118 366.9

(51) Int. Cl.
*B60W 30/095*     (2012.01)
*B60W 40/04*      (2006.01)
*B60W 50/14*      (2020.01)

(52) U.S. Cl.
CPC .... *B60W 30/0956* (2013.01); *B60W 30/0953* (2013.01); *B60W 40/04* (2013.01); *B60W 50/14* (2013.01); *B60W 2050/146* (2013.01); *B60W 2400/00* (2013.01); *B60W 2520/105* (2013.01);
(Continued)

(58) Field of Classification Search
CPC ........ B60W 30/0956; B60W 30/0953; B60W 40/04; B60W 50/14; B60W 2554/4041; B60W 2552/10; B60W 2050/146; B60W 2400/00; B60W 2520/105
See application file for complete search history.

(56) References Cited

U.S. PATENT DOCUMENTS

| 9,645,577 B1 * | 5/2017 | Frazzoli | ......... B60W 30/18163 |
| 2007/0003162 A1 * | 1/2007 | Miyoshi | ................. G06T 15/20 |
| | | | 382/276 |

(Continued)

FOREIGN PATENT DOCUMENTS

CN           107730889 A  *  2/2018   ........... G08G 1/0116

*Primary Examiner* — Dale W Hilgendorf
*Assistant Examiner* — Frank T Glenn, III
(74) *Attorney, Agent, or Firm* — Tarolli, Sundheim, Covell & Tummino LLP

(57) ABSTRACT

A method for controlling a motor vehicle (10) traveling on a road (12) in a current lane (14) is presented. The road (12) has at least one further lane (16) which is adjacent to the current lane (14) of the motor vehicle (10). The method comprises the following steps: A driving maneuver graph is generated and/or received, which contains information about at least two different driving maneuvers for the motor vehicle (10). One of the at least two possible driving maneuvers is selected by means of a machine learning module (36) which applies a machine learning method to the driving maneuver graph. A control device (30) for a system (26) for the control of a motor vehicle (10) is also proposed.

15 Claims, 8 Drawing Sheets

(52) U.S. Cl.
CPC . *B60W 2552/10* (2020.02); *B60W 2554/4041* (2020.02)

(56) References Cited

U.S. PATENT DOCUMENTS

| | | | |
|---|---|---|---|
| 2009/0157267 A1* | 6/2009 | Shin | B60W 50/0098 |
| | | | 701/70 |
| 2017/0297588 A1* | 10/2017 | Doshi | G06F 21/32 |
| 2019/0152490 A1* | 5/2019 | Lan | G06V 20/58 |
| 2020/0086855 A1* | 3/2020 | Packer | G05D 1/0289 |
| 2020/0182633 A1* | 6/2020 | Liu | B60K 35/28 |
| 2020/0184809 A1* | 6/2020 | Lee | G08G 1/0145 |
| 2020/0189580 A1* | 6/2020 | Schmidt | B60W 60/00276 |
| 2020/0207339 A1* | 7/2020 | Neil | G06V 20/58 |
| 2020/0279151 A1* | 9/2020 | Li | G06N 5/022 |

\* cited by examiner (a)  (b)

METHOD AND CONTROL DEVICE FOR A SYSTEM FOR THE CONTROL OF A MOTOR VEHICLE

RELATED APPLICATION

This application claims priority from German Application No. 10 2019 118 366.9, filed Jul. 8, 2019, the subject matter of which is incorporated herein by reference in its entirety.

BACKGROUND OF THE INVENTION

The invention relates to a method for the control of a motor vehicle, a control device for a system for the control of a motor vehicle, a motor vehicle, as well as a computer program for carrying out the method.

One of the main challenges for driver assistance systems that control the longitudinal movement and transverse movement of a motor vehicle in a partially automated manner, and above all for fully automated motor vehicles, is to analyze a specific situation in which the motor vehicle is located and, based on this, to derive appropriate driving maneuvers for the motor vehicle.

The complexity of the calculation of the driving maneuvers generally increases with the duration of the individual driving maneuvers. If different possible driving maneuvers are to be determined for a longer period of time, for example longer than three seconds, or if complex driving maneuvers with a plurality of lane changes are involved, previously known methods are often no longer able to determine them in real time.

A particular challenge here is that in almost every traffic situation there are many different possibilities in which the motor vehicle can be controlled. The various possibilities can differ greatly, for example in terms of the travel time required. Especially in heavy traffic, the previously known methods are often no longer able to select the appropriate one from the various possibilities for controlling the motor vehicle.

SUMMARY OF THE INVENTION

The object of the invention is therefore to provide a method and a control device for a system for the control of a motor vehicle, in which the disadvantages from the prior art are improved.

The object is achieved according to the invention by a method for controlling a motor vehicle that is traveling on a road in a current lane. The road has at least one further lane which is adjacent to the current lane of the motor vehicle. The method comprises the following steps: A driving maneuver graph is generated and/or received that contains information about at least two different driving maneuvers for the motor vehicle that are different from one another. One of the at least two possible driving maneuvers is selected by means of a machine learning module that applies a machine learning method to the driving maneuver graph.

In this case and below, a driving maneuver graph is to be understood as a graph which comprises a plurality of vertices and edges, in particular directed edges, the edges each connecting two different vertices to one another. Each continuous line of edges from one vertex to another vertex represents a possible driving maneuver for the motor vehicle.

The invention is based on the basic idea of first transferring the driving situation in which the motor vehicle is located into a driving maneuver graph and then selecting a driving maneuver from the driving maneuver graph using machine learning methods.

The representation of the various possible driving maneuvers in a driving maneuver graph is particularly suitable for machine learning methods, since there is a clear, deterministic, and quantifiable relationship between the individual vertices and thus between the individual possible driving maneuvers.

In the method according to the invention, it is therefore not necessary to first simulate the individual possible driving maneuvers in a complex manner in order to then select one of the driving maneuvers. Rather, the machine learning module makes the selection—similar to a person—based on "experience," that is, based on training with the corresponding training data sets, without knowing the details of the individual driving maneuvers or calculating them beforehand.

Computing time and computing power are saved because the computing-intensive simulation of the individual driving maneuvers before the selection of the driving maneuver. In particular, the driving maneuver can be selected in real time, that is to say without a significant deceleration, so that the method is suitable for being used in an autonomously driving motor vehicle.

The machine learning module preferably comprises an artificial neural network, in particular a graph neural network (hereinafter "GNN"). Due to the nature of their construction, GNNs are particularly suitable for selecting a driving maneuver from the driving maneuver graph. For details on GNNs, reference is made to the publication "Relational inductive biases, deep learning, and graph networks" by Peter W. Battaglia et al., ArXiv: 1806.01261, 2018.

One aspect of the invention provides that the driving maneuver graph comprises information about free areas of the road, occupied areas of the road that are occupied by other road users, lane keeping areas of the road in which it is not possible to change lanes between the two lanes, and/or change areas of the road in which a lane change between the two lanes is possible. The road is therefore mapped onto a space-time graph and the road is divided into different sub-areas in this space-time graph, namely into sub-areas in which a lane change is possible and into sub-areas in which no lane change is possible. Possible driving maneuvers between these individual sub-areas can then be determined very quickly and in a resource-saving manner, since only a small sub-area of the road always has to be considered and not the entire road traffic situation.

According to a further aspect of the invention, at least one space-time polygon corresponding to the current lane, at least one space-time polygon corresponding to the at least one further lane, and at least one space-time polygon corresponding to the occupied areas are determined. The space-time polygons corresponding to the free areas of the two lanes are determined from the determined space-time polygons by means of polygon clipping. In particular, those polygons that correspond to the occupied areas are each removed from the polygons that correspond to one of the two lanes in order to determine the free areas. The determination of the free areas is thus reduced to a geometric operation that can be carried out very quickly and in a resource-saving manner, which saves computing time in determining the possible driving maneuvers.

According to one embodiment of the invention, at least in each case a vertex of the driving maneuver graph is assigned to the free areas, the change areas, and/or the lane keeping areas. A sequence of driving maneuvers that can be carried out in succession therefore results from an interrupted line of edges along the vertices in the ascending direction of time. In this way, the driving maneuver graph is generated that contains a plurality of different possible driving maneuvers, in particular all possible driving maneuvers. The generated driving maneuver graph is then processed further by the machine learning module, the machine learning module selecting the driving maneuver to be carried out from the possible driving maneuvers.

The vertices of the driving maneuver graph are preferably connected in pairs to an edge, in particular a directed edge, if a driving maneuver between the corresponding free areas, change areas, and/or lane keeping areas is possible, which are assigned to the vertices. In other words, the individual vertices are only connected to one another if the motor vehicle can actually drive from one free area, change area, and/or lane keeping area into the other free area, change area, and/or lane keeping area.

The vertices and/or the edges can each have at least one attribute and/or the driving maneuver graph can have at least one global attribute.

The vertices have, for example, one or more of the following attributes: spatial extent of the respective free area, temporal extent of the respective free area, speed of the motor vehicle, and/or speeds of at least those other road users who limit the respective free area.

The edges have, for example, one or more of the following attributes: spatial distance between the two vertices that connects the corresponding edge; temporal distance between the two vertices connecting the corresponding edge; and/or a route parameter that indicates whether the corresponding edge is part of the shortest possible route.

In particular, the route parameter is either 0 if the corresponding edge is not part of the shortest possible route in the temporal and/or spatial sense, and equal to 1 if the corresponding edge is part of the shortest possible route. The reverse definition is of course also possible.

For example, the at least one global attribute is one or more of the following: a speed limit; right of way, and/or traffic rules that apply in the area in front of the motor vehicle; road conditions that deviate from the norm, for example due to weather or damage to the road; and/or a safety factor that indicates whether the driving maneuver to be carried out is a standard driving maneuver or a safety maneuver, for example an evasive maneuver.

Another aspect of the invention provides that the machine learning module is used to select the possible driving maneuver whose assigned sum of the attributes of the edges and/or the attributes of the vertices is minimal or maximal. For example, the driving maneuver is selected in which the motor vehicle has to cover the shortest route or in which the motor vehicle requires the shortest time. In this case, the attribute of the edges "spatial distance between the connected vertices" or "required time between the connected vertices" is added up and the driving maneuver with the lowest sum of the attributes is selected. In other words, in this case the GNN carries out a search for the shortest path (spatial or temporal) in the driving maneuver graph.

According to a further embodiment of the invention, it is determined whether the motor vehicle can reach the free areas, the lane keeping areas, and/or the change areas, in particular wherein a current speed of the motor vehicle, a maximum deceleration of the motor vehicle, a maximum acceleration of the motor vehicle, and/or a speed limit are taken into account.

In order to save computing power and/or computing time, a simplified model of the motor vehicle is preferably used for this. For example, the motor vehicle is described as a point mass. In the context of the model, those "extreme" trajectories are then determined that limit the trajectories that are possible for the motor vehicle. Those vertices that correspond to those sub-areas that the motor vehicle cannot reach can then be removed from the driving maneuver graph or not be taken into account. This simplifies the driving maneuver graph and the selection of the driving maneuver by the machine learning module is made easier.

Preferably, at least the current lane and/or the at least one further lane are or is transformed into a Frenet-Serret coordinate system. In this coordinate system, every road is free of curvature, so that regardless of an actual course of the road, every road traffic situation can be treated in the same way. In particular, the space-time polygons described above are determined in the Frenet-Serret coordinate system.

According to one embodiment of the invention, the motor vehicle is controlled according to the selected driving maneuver. Alternatively or additionally, the driver is given information based on the selected driving maneuver. The motor vehicle is at least partially controlled automatically, in particular fully automatically, based on the selected driving maneuver.

It is also conceivable that the machine learning module selects at least two different driving maneuvers. A driver of the motor vehicle is shown information about the various driving maneuvers and the driver can decide which of the driving maneuvers should be carried out.

The object is furthermore achieved according to the invention by a control device for a system for controlling a motor vehicle or for a motor vehicle, the control device being designed to carry out an above-described method. With regard to the advantages and features, reference is made to the above explanations regarding the method, which correspondingly also apply to the control device.

The object is further achieved according to the invention by a motor vehicle having a control device described above. With regard to the advantages and features, reference is made to the above explanations regarding the method, which correspondingly also apply to the motor vehicle.

The object is furthermore achieved according to the invention by a computer program having program code means in order to carry out the steps of a method described above if the computer program is executed on a computer or a corresponding computing unit, in particular a computing unit of a control device described above. With regard to the advantages and features, reference is made to the above explanations regarding the method, which correspondingly also apply to the computer program.

The term "program code means" refers here and below to computer-executable instructions in the form of program code and/or program code modules in compiled and/or in uncompiled form, which can be in any programming language and/or in machine language.

BRIEF DESCRIPTION OF THE DRAWINGS

Further advantages and characteristics of the invention will become apparent from the following description and the accompanying drawings, to which reference is made. In the drawings.

DESCRIPTION

Figure 1:
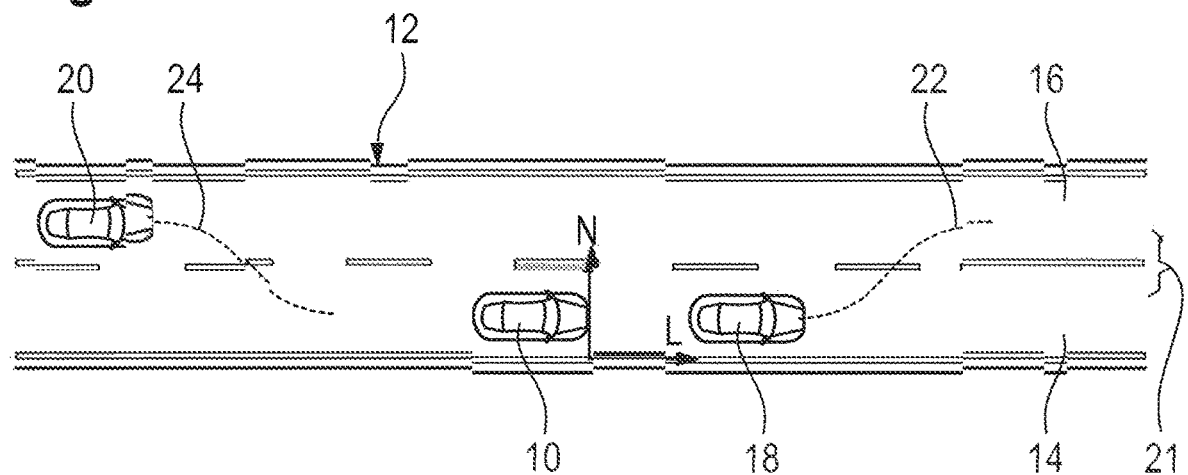
FIG. 1 shows schematically a road traffic situation.

FIG. 1 shows schematically a road traffic situation in which a motor vehicle 10 is traveling on a road 12 in a current lane 14. Another lane 16 runs adjacent to the current lane 14.

In addition, a first further road user 18 and a second further road user 20 drive on the road 12 in the current lane 14 or in the further lane 16. In the example shown, the other road users 18, 20 are passenger cars, but could also be trucks, motorcycles, or any other road users.

Between the current lane 14 and the further lane 16 there is a lane change zone 21, which partially overlaps with the current lane 14 and the further lane 16.

The dashed lines 22 and 24 indicate that the first further road user 18 plans in the near future to change from the current lane 14 via the lane change zone 21 to the further lane 16 or that the second further road user 20 plans in the near future to change from the further lane 16 via the lane change zone into the current lane 14 of the motor vehicle 10. This is indicated by the other road users 18, 20, for example, by using the corresponding direction indicator.

In addition, a coordinate system with a longitudinal axis and a normal axis is shown in FIG. 1, the longitudinal axis defining a longitudinal direction L and the normal axis defining a transverse direction N. The origin of the coordinate system lies in the longitudinal direction L at the current position of the tip of the motor vehicle 10 and, viewed in the longitudinal direction L, on the right side of the road.

This special coordinate system, which is also used in the following, is a road-fixed coordinate system, which consequently does not therefore move with the motor vehicle 10. Of course, any other coordinate system can also be used.

Figure 2:
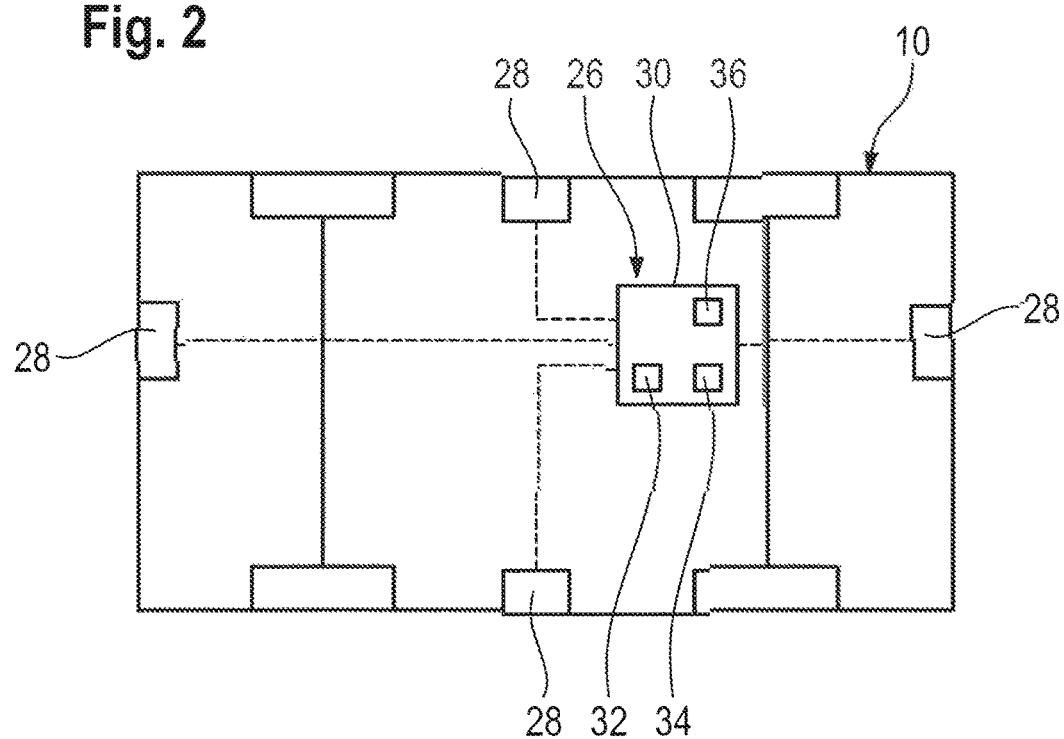
FIG. 2 shows a schematic block diagram of a system for the control of a motor vehicle according to the invention.
Figure 3:
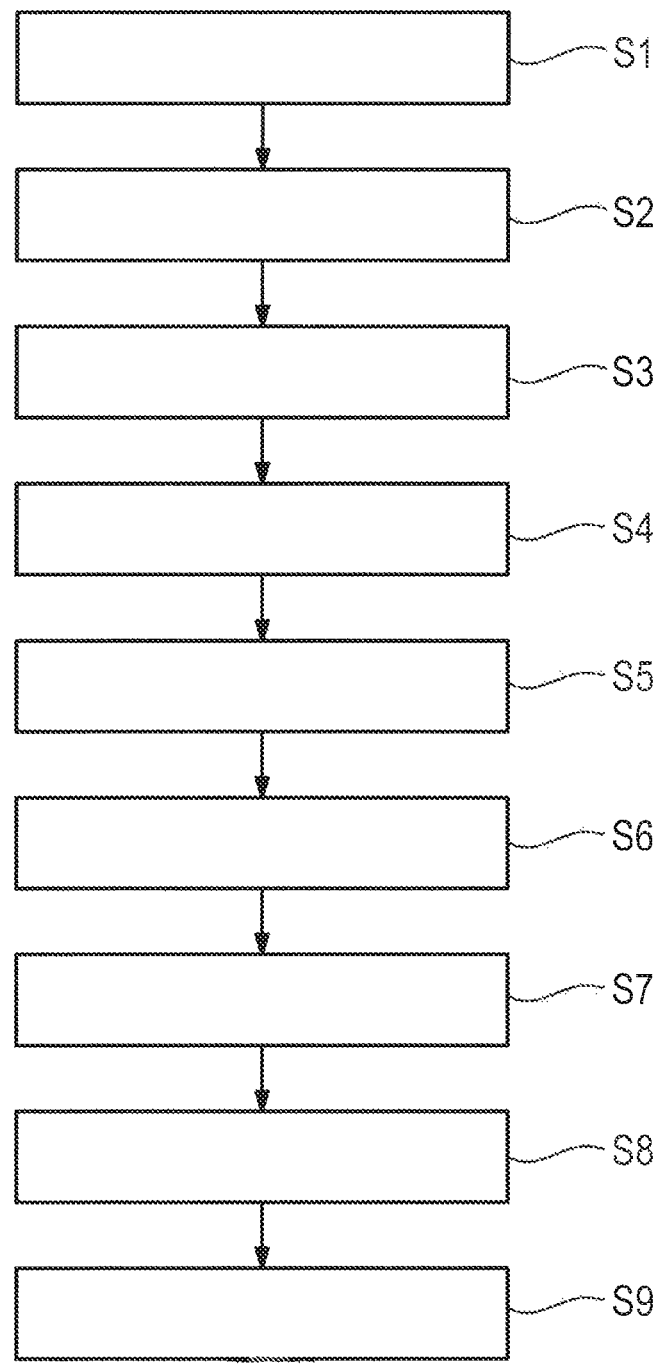
FIG. 3 shows a flow chart of the steps of a method according to the invention.

As shown in FIG. 2, the motor vehicle 10 has a system 26 for the control of the motor vehicle 10. The system 26 comprises a plurality of sensors 28 and at least one control device 30.

The sensors 28 are arranged at the front, rear, and/or on the side of the motor vehicle 10 and are designed to detect the surroundings of the motor vehicle 10, to generate corresponding environment data and to forward them to the control device 30. More specifically, the sensors 28 detect information at least about the current lane 14, the further lane 16, and the other road users 18, 20.

The sensors 28 are each a camera, a radar sensor, a distance sensor, a LIDAR sensor, and/or any other type of sensor that is suitable for detecting the surroundings of the motor vehicle 10.

As an alternative or in addition, at least one of the sensors 28 can be designed as an interface to a control system, which is assigned to at least the segment of the road 12 shown and is designed to transmit environment data about the road 12 and/or about the other road users to the motor vehicle 10 and/or to the other road users 18, 20. In this case, the one sensor 28 can be designed as a mobile radio communication module, for example for communication in accordance with the 5G standard.

In general terms, the control device 30 processes the environment data received from the sensors 28 and controls the motor vehicle 10 in an automated manner, in particular fully automatically, based on the processed environment data. A driver assistance system is thus implemented on the control device 30, which can control a transverse movement and/or a longitudinal movement of the motor vehicle 10 at least partially in an automated manner, in particular fully automatically.

For this purpose, the control device 30 is designed to carry out the method steps explained below with reference to FIGS. 3 to 10. More precisely, the control device 30 comprises a data carrier 32 and a computing unit 34, a computer program being stored on the data carrier 32, which is executed on the computing unit 34 and comprises the program code means in order to carry out the steps of the method explained below.

First, the road 12, more precisely an image of the current lane 14 and the further lane 16 based on the environment data obtained from the sensors 28, is transformed into a Frenet-Serret coordinate system (step S1).

Figure 4:
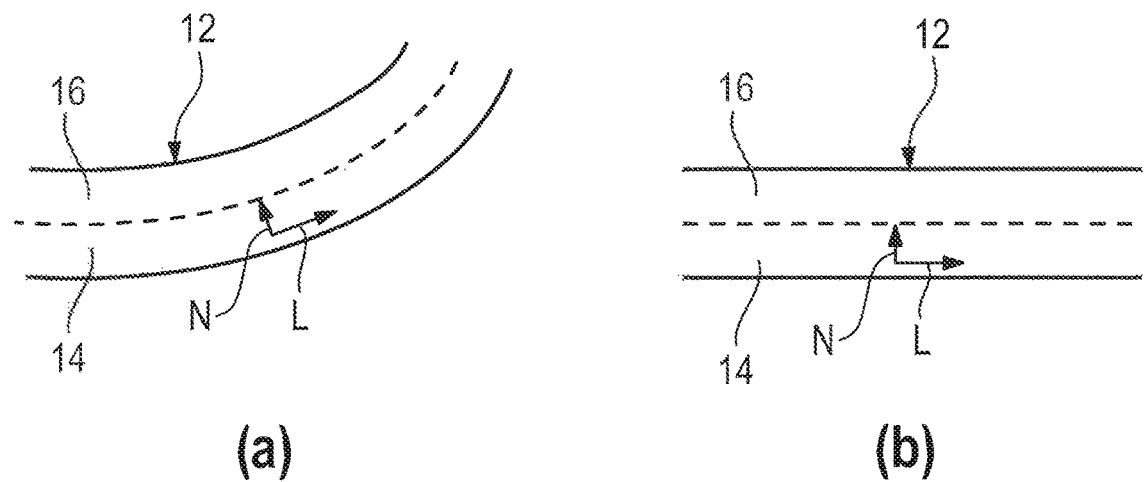
FIGS. 4(a) and 4(b) schematically show a road before a transformation into a Frenet-Serret coordinate system or the road after a transformation into a Frenet-Serret coordinate system.

Step S1 is illustrated in FIG. 4. FIG. 4 (a) shows the actual course of the road 12. In the example shown, the road has a curvature to the left, as seen in the longitudinal direction L. A local coordinate transformation transforms the road 12 into the Frenet-Serret coordinate system, in which the street 12 no longer has any curvature, the result of this transformation being shown in FIG. 4 (b). As can be clearly seen, in this coordinate system the road 12 runs straight and without curvature along the longitudinal direction L.

Next, free areas $B_f$ and occupied areas $B_b$ are determined in the current lane 14 and in the further lane 16 (step S2), the free areas $B_f$ and the occupied areas $B_b$ each being spatio-temporal areas.

The free areas $B_f$ are those spatio-temporal areas that are free from the other road users 18, 20 and other obstacles that prevent driving in the respective lane 14, 16.

The occupied areas $B_b$, on the other hand, are those spatio-temporal areas that are occupied by the other road users 18, 20 and/or by other obstacles, so that the occupied areas $B_b$ cannot be driven through by the motor vehicle 10.

In order to determine the occupied areas, the control device 30 requires predicted trajectories 22, 24 of the other road users 18, 20. The control device 30 can determine the trajectories 22, 24 itself, for example based on the environment data obtained from the sensors 28, such as the information that a direction indicator of another road user 18, 20 is activated, or based on data exchanged via inter-vehicle communication. Alternatively, the control device 30 can receive the trajectories 22, 24 directly from the other road users 18, 20 or from the control system.

Figure 5:
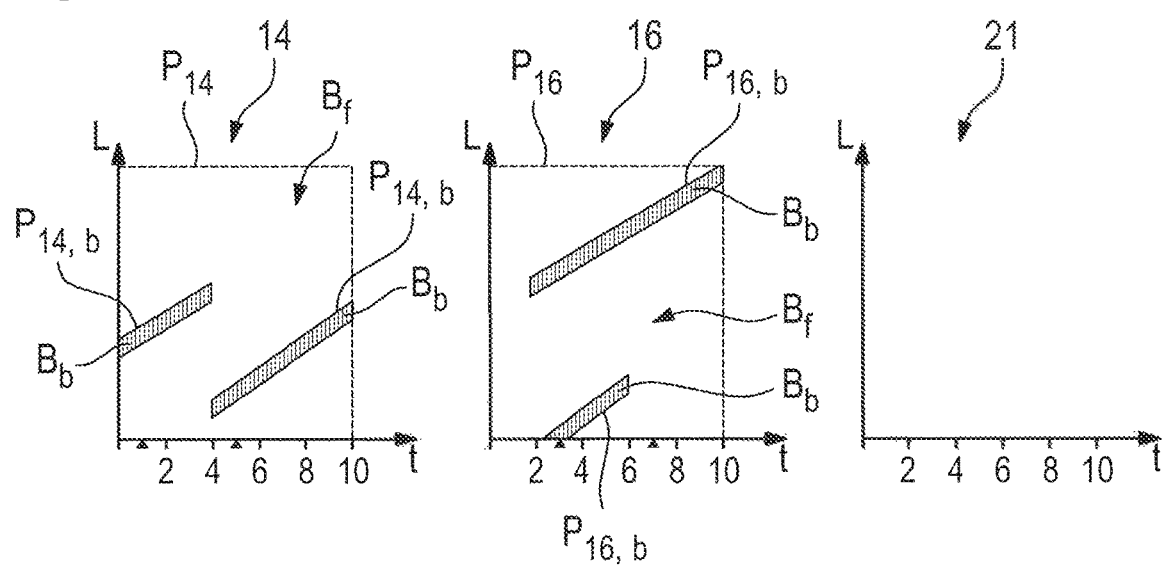
FIGS. 5 to 11 each illustrate individual steps of the method according to the invention from FIG. 3.

As shown in FIG. 5 using the specific example of FIG. 1, the free areas $B_f$ and the occupied areas $B_b$ are first determined for the current lane 14 and for the further lane 16, respectively in a t-L-graph, where t is time.

In this example, the first further road user 18 starts a lane change maneuver from the current lane 14 to the further lane 16 at the time t=1 s, which maneuver is completed at the time t=5 s. In the graphs shown in FIG. 5, the first further road user 18 occupies the upper of the two occupied areas $B_b$. During the lane change process, the first further road user 18 occupies both lanes 14, 16 at least temporarily.

The second further road user 20 starts a lane change maneuver from the further lane 16 to the current lane 14 at the time t=3 s, which maneuver is completed at the time t=7 s. In the graphs shown in FIG. 5, the second further road user 20 occupies the lower of the two occupied areas $B_b$.

The gradient of the occupied areas $B_b$ corresponds to the speed of the corresponding other road user 18 or 20. In the example shown in FIGS. 5 to 10, the speed of the other road users 18, 20 is therefore constant.

For simplification, the coordinate in the transverse direction N is discretized, so it can only assume the three different values that correspond to the current lane 14, the further lane 16, or the lane change zone 21. The three graphs shown in FIG. 5 are each a t-L-graph for the current lane 14, for the further lane 16, and for the lane change zone 21.

The hatched segments in the graphs each correspond to the occupied areas $B_b$ of the respective lane 14, 16. By contrast, the unshaded segments in the graphs correspond to the free areas $B_f$ of the respective lane 14, 16.

To determine the free areas $B_f$, a space-time polygon $P_{14}$ or $P_{16}$ is first determined for each lane 14, 16, which corresponds to the entire lane 14 or 16 in front of the motor vehicle 10, in particular the proportion of the lanes 14, 16, which is within range of the sensors 28. In FIG. 5, the polygons $P_{14}$ and $P_{16}$ are the quadrilaterals indicated by the broken lines.

Furthermore, space-time polygons $P_{14,b}$ and $P_{16,b}$ which surround the occupied areas $B_b$ of the respective lane 14, 16 are determined respectively for the two lanes 14, 16.

The free areas $B_f$ in the current lane 14, or rather a polygon $P_{14,f}$ which corresponds to the free areas $B_f$, is then determined by polygon clipping by removing the polygons $P_{14,b}$ from the polygon $P_{14}$. In other words, it is therefore the operation $$P_{14,f} = P_{14} \setminus P_{14,b}.$$

Analogously, the free areas $B_f$ in the further lane 16 are determined by polygon clipping by removing the polygons $P_{16,b}$ from the polygon $P_{16}$. The operation $P_{16,f} = P_{16} \setminus P_{16,b}$ is therefore carried out.

Figure 6:
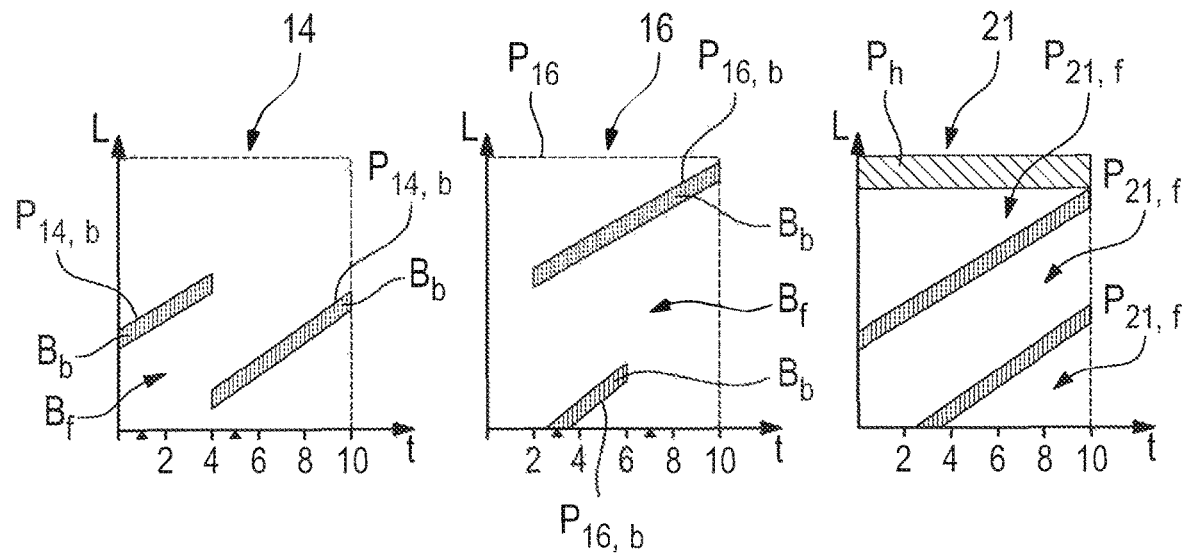

Next, as illustrated in FIG. 6, the free sub-areas of the lane change zone 21 are determined (step S3). Here, the lane change zone 21 is free if both the current lane 14 and the further lane 16 are free and if the lane change zone 21 is not passable for other reasons, for example due to obstacles or a no overtaking rule.

Therefore, the free sub-areas of the lane change zone 21, or rather a polygon $P_{21,f}$ which corresponds to the free sub-areas of the lane change zone 21, are determined as the intersection of the two polygons $P_{14,f}$ and $P_{16,f}$. If the lane change zone 21 is not passable due to an obstacle or otherwise, a corresponding space-time polygon $P_h$, which encloses the non-passable sub-area of the lane change zone 21, is determined and removed from the intersection mentioned above.

In other words, the free sub-areas $P_{21,f}$ of the lane change zone 21 thus result from the operation $$P_{21,f} = (P_{14,f} \cap P_{16,f}) \setminus P_h.$$

Figure 7:
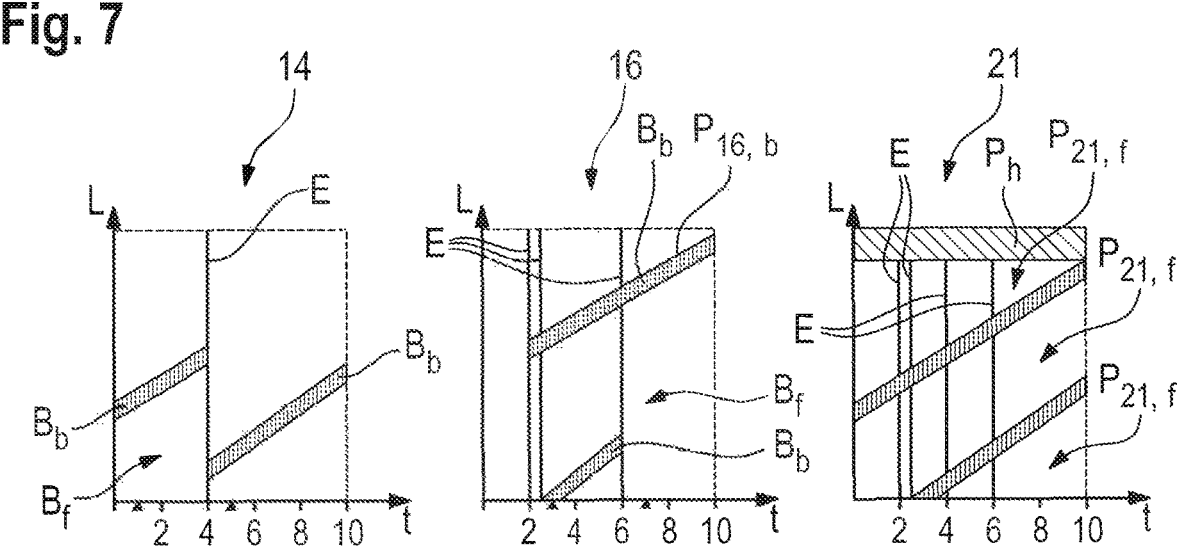

Now the graphs for the current lane 14 and for the further lane 16 are each divided into time strips (step S4), wherein a new time strip begins with each event. In FIG. 7, the various time strips are separated from one another by vertical dividing lines E, which are inserted into the graph for an event. An event is to be understood here and in the following to mean any type of change in the occupancy of the respective lane 14, 16.

If an occupancy of any sub-area of the current lane 14 or the further lane 16 begins or ends at a specific point in time, a new time strip begins in the graph for the current lane 14 or for the further lane 16 at this point in time.

The dividing lines E between the individual time strips in the graphs for both lanes 14, 16 are also transferred to the graph for the lane change zone 21.

Figure 9:
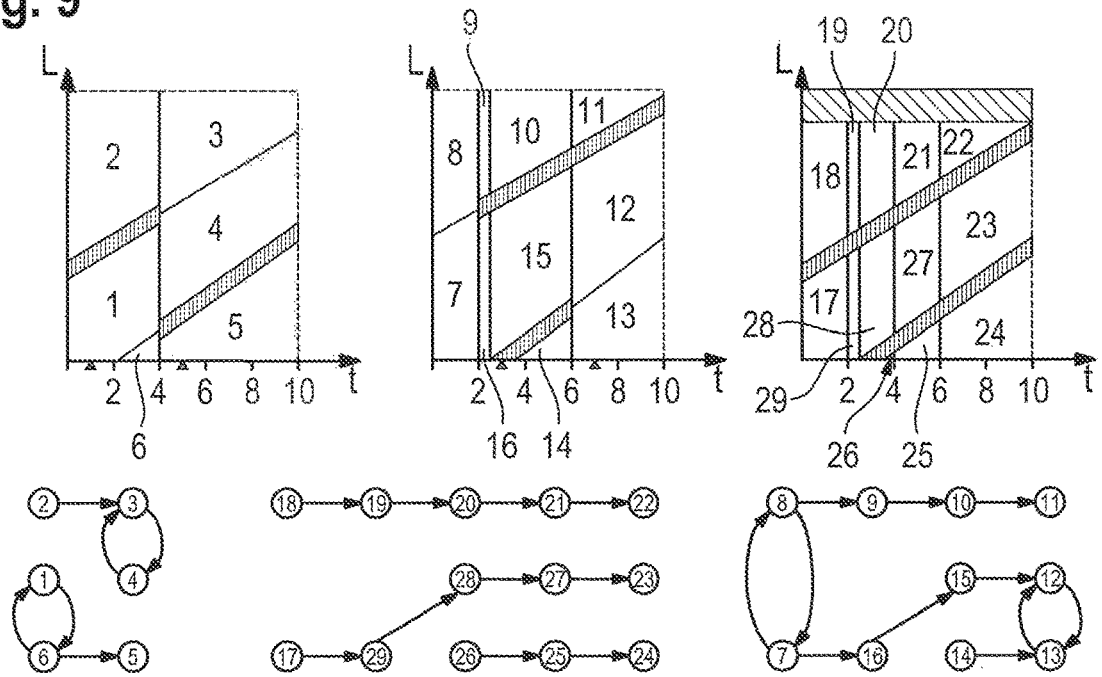
Figure 10:
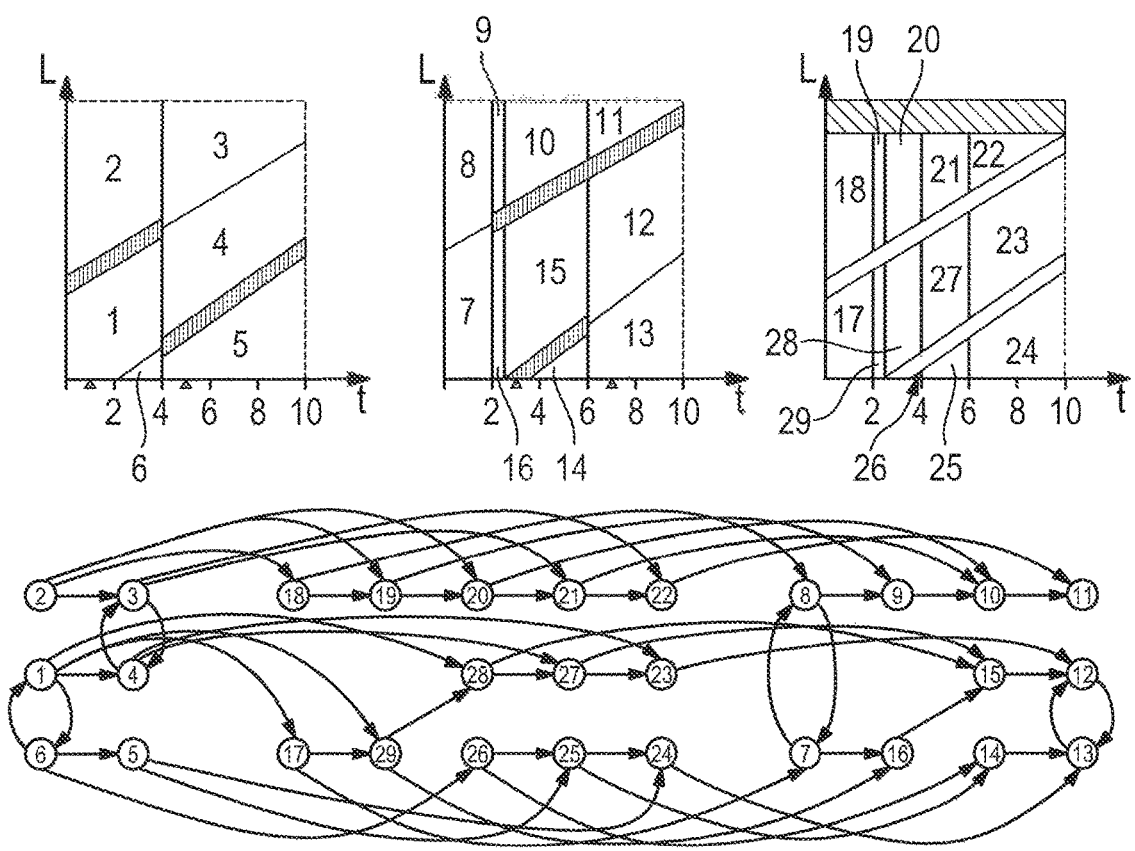

In order to achieve a consistent division of the graphs between the three graphs for the current lane 14, for the further lane 16, and the lane change zone 21, oblique dividing lines T are inserted into the graphs for the current lane 14 and the further lane 16, which each represent an extension of one of the occupied areas $B_b$. These additional oblique dividing lines T are shown in FIGS. 8 to 10.

The vertical dividing lines E, the oblique dividing lines T, and the occupied areas $B_b$ divide each of the three graphs into a plurality of sub-areas $T_i$, where i is a natural number greater than zero, which can take on values from 1 to a total number of sub-areas $T_i$.

Figure 8:
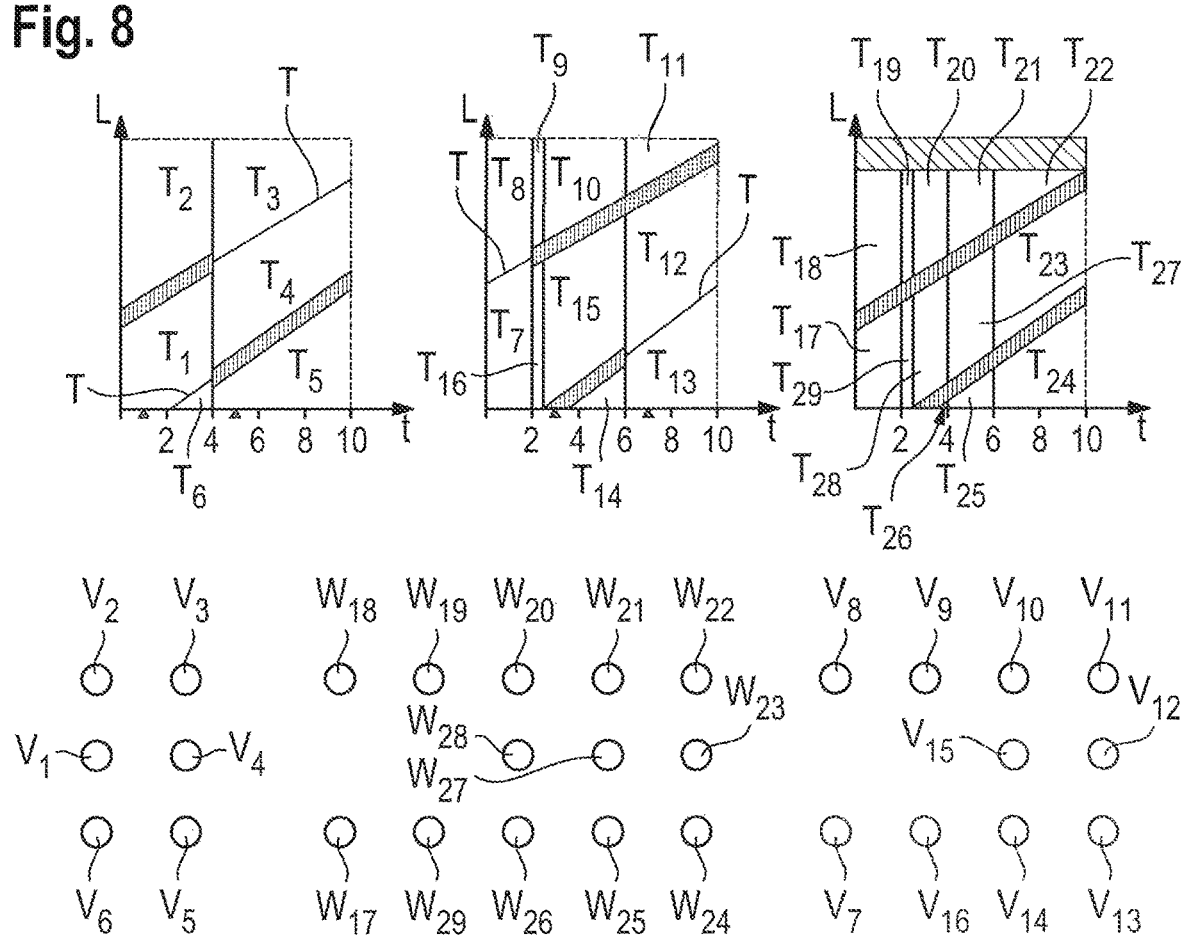

As shown in FIG. 8, a lane vertex $V_i$, is each assigned to each of the sub-areas $T_i$ of the graphs for the current lane 14 and for the other lane 16 in the next step, whereas a change zone vertex $W_i$ is each assigned to each sub-area $T_i$ of the graph for the lane change zone 21 (step S5). Here again, i is a natural number greater than zero, which can assume values from 1 up to a total number of sub-areas $T_i$.

In FIG. 8, the lane vertices $V_i$ and the change zone vertices are each arranged by time in the graph, i.e. those vertices which correspond to sub-areas $T_i$ with shorter times are further to the left than those vertices which are assigned to sub-areas $T_i$ with longer times.

Next, the lane vertices $V_i$ of the current lane 14 are connected in pairs by edges (step S6), more precisely by directional edges, if a driving maneuver of the motor vehicle 10 is possible between the sub-areas $T_i$ to which the lane vertices $V_i$ are assigned.

A driving maneuver is defined as "possible" if and only if the two sub-areas $T_i$ directly adjoin one another, that is, they are not separated from one another by an occupied area $B_b$. In addition, a driving maneuver is of course only possible in the positive direction of time.

The same procedure is repeated for the lane vertices $V_i$ of the further lane 16 and for the change zone vertices $W_i$ of the lane change zone 21.

It should be noted that the letters "T," "V" and "W" have been omitted from FIGS. 9 and 10 for reasons of clarity. Instead, the sub-areas and the vertices were simply given the corresponding number. In FIGS. 9 and 10, numbers are not reference numerals, but represent the index of the corresponding sub-area or the corresponding vertex.

The result of step S6 is shown in FIG. 9. The driving maneuver graph obtained in step S6 already contains all possible driving maneuvers for the motor vehicle 10 within the two lanes 14, 16 and within the lane change zone 21.

Next, those lane vertices $V_i$ of the current lane 14 are connected to those change zone vertices $W_i$ via directional edges whose assigned sub-areas $T_i$ of the current lane 14 or lane change zone 21 overlap one another (step S7). In other words, those lane vertices $V_i$ are connected to those change zone vertices whose assigned sub-areas $T_i$ have an intersection that is not empty if the two graphs for the current lane 14 and for the lane change zone 21 are superimposed.

In addition, those change zone vertices W are connected to those lane vertices $V_i$ of the further lane 16 via directional edges whose associated sub-areas 7, of the lane change zone 21 or the further lane 16 overlap one another. Thus, those lane vertices $V_i$ are connected to those change zone vertices whose assigned sub-areas T have an intersection that is not empty if the two graphs for the further lane 16 and for the lane change zone 21 are superimposed.

In other words, in step S7, the individual sub-areas T of the free areas $B_f$ are divided into change areas in which a lane change between the two lanes 14, 16 is possible, and lane keeping areas in which a lane change between the two lanes 14, 16 is not is possible.

The result of step S7 is shown in FIG. 10 (below). The driving maneuver graph obtained in step S7 contains all possible driving maneuvers for the motor vehicle 10, which include a change from the current lane 14 into the further lane 16. Each of the possible driving maneuvers corresponds to an uninterrupted line of edges in the driving maneuver graph shown in FIG. 10.

The driving maneuver graph obtained by the method described above is relatively complex. The method can be modified as follows to obtain a simpler driving maneuver graph.

Firstly, the oblique dividing lines T can be dispensed with. In addition, some of the vertical dividing lines E can be removed or not inserted at all.

For example, the dividing lines shown in FIG. 9 between the areas 1 and 6, 8 and 9, 9 and 10, 10 and 11 and all vertical dividing lines between the areas 18 to 22, 17 to 23 and 26 to 24 can be dispensed with.

Figure 11:
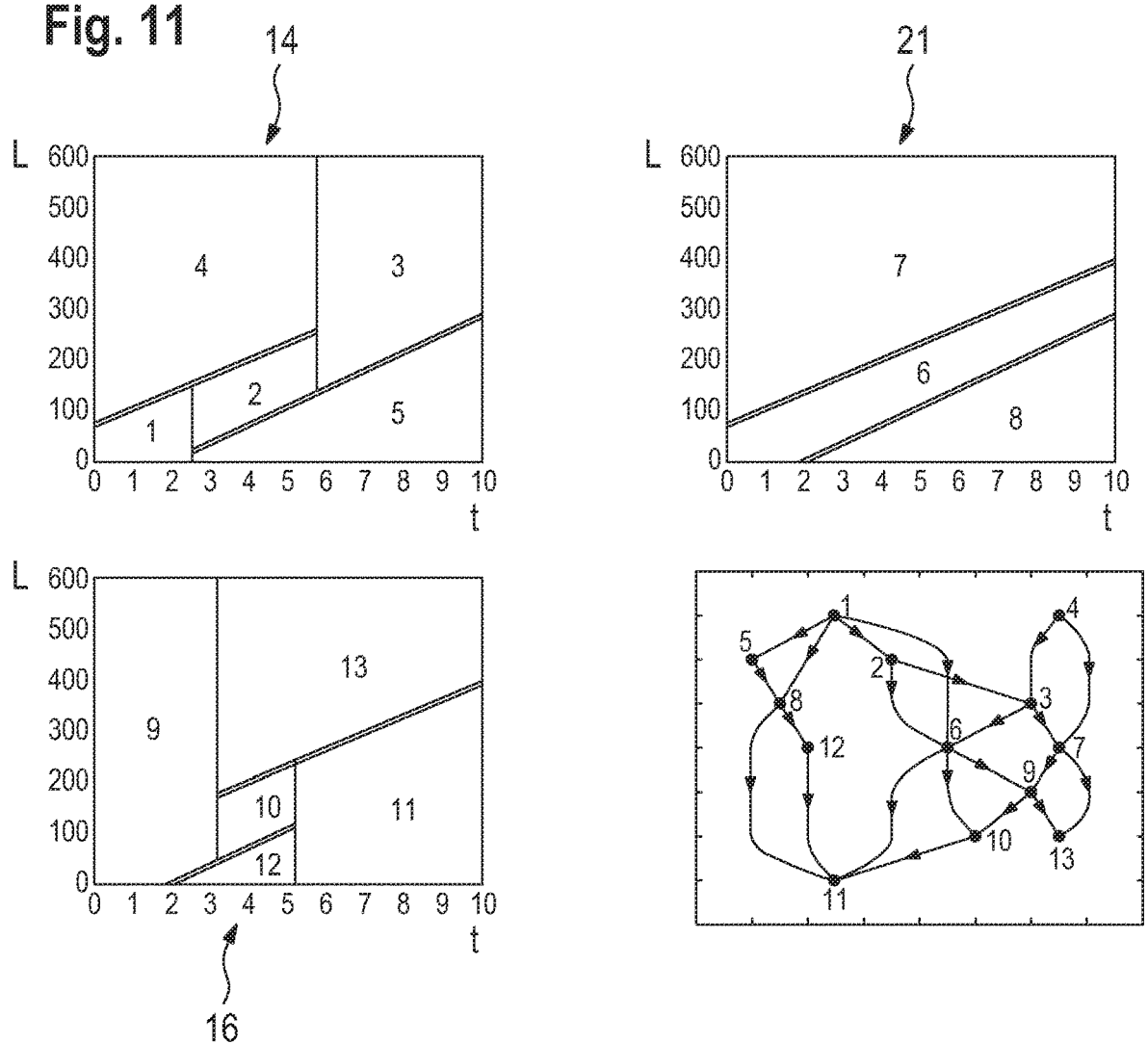

As a result of these simplifications, a simplified driving maneuver graph is obtained, which is shown at the bottom right in FIG. 11.

As an alternative or in addition, it can be determined whether the motor vehicle 10 can even reach the free areas $B_f$, the lane keeping areas, and/or the change areas.

For this purpose, based on a maximum acceleration of the motor vehicle 10, a maximum deceleration of the motor vehicle 10, and/or an existing speed limit, it is determined whether a trajectory that is feasible for the vehicle exists between the starting point of the motor vehicle 10 and the respective sub-area $T_i$.

In order to save computing power and/or computing time, a simplified model of the motor vehicle 10 is preferably used for this purpose. For example, the motor vehicle is described as a point mass. In the context of the model, those "extreme" trajectories are then determined that limit the trajectories that are possible for the motor vehicle.

Those vertices that correspond to those sub-areas T that the motor vehicle 10 cannot reach can then be removed from the driving maneuver graph or not taken into account.

The following explanations apply to all of the variants described above for obtaining the driving maneuver graph.

One of the possible driving maneuvers is selected by means of a machine learning module 36 of the control device 30 by applying a machine learning method to the driving maneuver graph obtained (step S8), which is explained in more detail below.

More specifically, the machine learning module 36 comprises an artificial neural network which is designed as a graph neural network (hereinafter "GNN").

It should be pointed out that, as shown in FIG. 2, the machine learning module 36 does not necessarily have to be a component separate from the data carrier 32 and the computing unit 34. Of course, the machine learning module 36 36 can be stored in the form of an executable computer program on the data carrier and can be executed on the computing unit.

In general terms, the GNN is designed or trained to automatically select a continuous line of edges from the driving maneuver graph that corresponds to an optimized, in particular an optimal driving maneuver.

Figure 12:
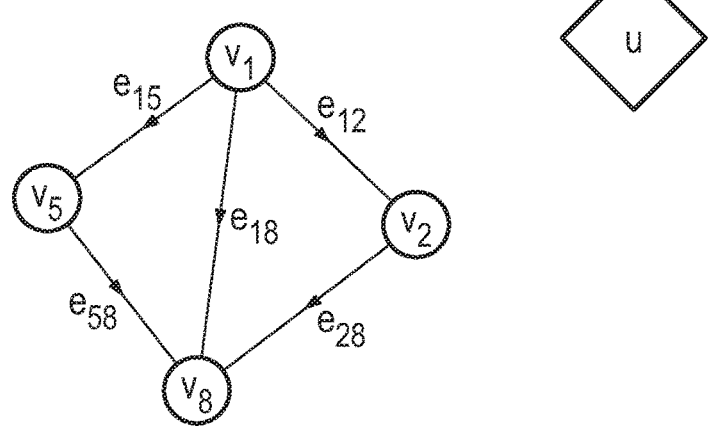
FIG. 12 shows a section of a graph neural network.

As shown in FIG. 12 with the aid of a section from the graph in FIG. 11, at least one attribute $v_i$ or $e_k$ is assigned to each vertex and each edge of the driving maneuver graph. i and k are the number of the corresponding vertex or edge. $v_i$ and $e_k$ each represent an individual attribute or a set of attributes of the respective vertex or edge.

The vertices have, for example, one or more of the following attributes: spatial extent of the respective free area, temporal extent of the respective free area, speed of the motor vehicle 10, and/or speeds of at least those other road users 18, 20 which limit the respective free area.

The edges have, for example, one or more of the following attributes: spatial distance between the two vertices that connects the corresponding edge; temporal distance between the two vertices connecting the corresponding edge; and/or a route parameter that indicates whether the corresponding edge is part of the shortest possible route.

In particular, the route parameter is either 0 if the corresponding edge is not part of the shortest possible route in the temporal and/or spatial sense, and equal to 1 if the corresponding edge is part of the shortest possible route. The reverse definition is of course also possible.

Alternatively or additionally, at least one global attribute u can be assigned to the driving maneuver graph. For example, the at least one global attribute is one or more of the following: a speed limit; right of way, and/or traffic rules that apply in the area in front of the motor vehicle 10; road conditions that deviate from the norm, for example due to weather or damage to the road 12; and/or a safety factor that indicates whether the driving maneuver to be carried out is a standard driving maneuver or a safety maneuver, for example an evasive maneuver.

According to a variant of the method, the driving maneuver selected in step S8 is the one whose assigned sum of the attributes $v_i$ of the edges and/or the attributes $e_k$ of the vertices is minimal or maximal, depending on the definition of the individual attributes.

According to a further variant of the method, the attributes $v_i$ of the vertices, the attributes $e_k$ of the edges, and/or the at least one global attribute u are included in a cost functional that assigns a cost factor to each driving maneuver. Then, depending on the definition of the cost functional or the cost factor, the driving maneuver is selected whose assigned cost factor is minimal or maximal.

For example, the driving maneuver in which the motor vehicle 10 has to cover the shortest route or in which the motor vehicle 10 requires the least time can be selected in the manner described above. In this case, the attribute of the edges "spatial distance between the connected vertices" or "required time between the connected vertices" is added up and the driving maneuver with the lowest sum of the attributes is selected. In other words, in this case the GNN carries out a search for the shortest path (spatial or temporal) in the driving maneuver graph.

Finally, one of the target driving maneuvers is selected and, according to the selected driving maneuver, the motor vehicle 10 is controlled in an at least partially automated manner by the control device 30, in particular in a completely automated manner (step S9).

It is also conceivable that the machine learning module 36 selects at least two different driving maneuvers. A driver of the motor vehicle 10 is shown information about the various driving maneuvers and the driver can decide which of the driving maneuvers should be carried out.

Before the machine learning module 36, more precisely the GNN, can be used, it must be trained. A training method for the GNN is explained below with reference to FIG. 13.

In general terms, a training step for the GNN is in each case a mapping from a driving maneuver graph, that is to say from a set of vertices, edges, and attributes, to another modified driving maneuver graph.

In principle, the modified driving maneuver graph can have a changed number of vertices and/or edges. However, in the following it is assumed that only the attributes of the vertices, the attributes of the edges, and/or the at least one global attribute are adapted in each training step.

Figure 13:
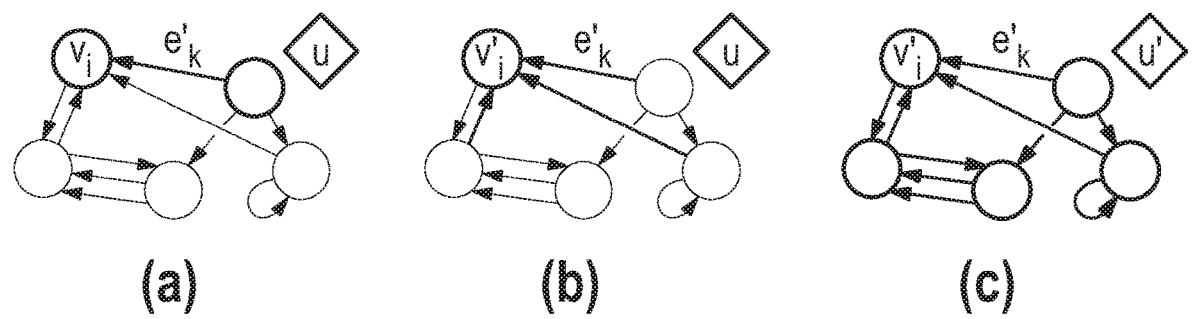
FIG. 13 illustrates the training steps for a graph neural network.

A first step of the training is illustrated in FIG. 13 (a), in which initially adapted attributes $e'_k$ of the edges are determined. These are determined on the basis of a function $\phi^e$, which maps all the attributes $v_i$, $e_k$, and u to the adapted attributes $e'_k$.

FIG. 13 (b) shows a second step of the training for the GNN, in which adapted attributes $v'_i$ of the vertices are determined. These are determined on the basis of a function $\phi^v$, which maps the adapted attributes $e'_k$ of the edges and the original attributes $v_i$ and u to the adapted attributes $v'_i$.

FIG. 13 (c) illustrates a third step of the training for the GNN, in which the at least one global attribute u is adapted. The at least one adapted global attribute u' is determined based on a function $\phi^u$ which maps the adapted attributes e'k of the edges, the adapted attributes $v'_i$ of the vertices, and the at least one original global attribute u to the at least one adapted global attribute u.

As usual when training neural networks, the GNN is trained with a plurality of training data sets.

The training data records each contain a driving maneuver graph and information about an optimal driving maneuver in the respective driving maneuver graph. The information about the optimal driving maneuver can be contained in the training data records in different ways. For example, the route parameter explained above is set to 1 for those edges (or to the value which indicates that the corresponding edge is part of the shortest route) which are part of the shortest route.

Details on training GNNs can be found, for example, in the following publication: "Relational inductive biases, deep learning, and graph networks," Peter W. Battaglia et al., ArXiv: 1806.01261, 2018.

The invention claimed is:

1. A method for controlling a motor vehicle traveling on a road in a current lane, the road having at least one further lane which is adjacent to the current lane of the motor vehicle, comprising the following steps:
generating and/or receiving a driving maneuver graph containing information about at least two different possible driving maneuvers for the motor vehicle; and
selecting one of the at least two possible driving maneuvers by means of a machine learning module which applies a machine learning method to the driving maneuver graph,
wherein the driving maneuver graph is divided into a plurality of sub-areas by occupied areas representing areas in the current lane and/or the at least one further lane that are occupied by other road users, vertical dividing lines representing a change in occupancy of the current lane and/or the at least one further lane, and oblique dividing lines representing an extension of the occupied areas, wherein a gradient of the occupied areas corresponds to a speed of the other road users, and
wherein the motor vehicle is controlled according to the selected driving maneuver and/or information is given to the driver on the basis of the selected driving maneuver.

2. The method according to claim 1, wherein the machine learning module comprises an artificial neural network, in particular a graph neural network (GNN).

3. The method according to claim 1, wherein the driving maneuver graph provides information about free areas of the road, the occupied areas of the road which are occupied by the other road users, lane keeping areas of the road, in which a lane change between the two lanes is not possible, and/or change areas of the road, in which a lane change between the two lanes is possible.

4. The method according to claim 3, wherein at least one space-time polygon corresponding to the current lane, at least one space-time polygon corresponding to the at least one further lane, and at least one space-time polygon corresponding to the occupied areas is determined, wherein the space-time polygons corresponding to the free areas of the two lanes are determined by means of polygon clipping, in particular those polygons that correspond to the occupied areas are each removed from the polygons that correspond to one of the two lanes in order to determine the free areas.

5. The method according to claim 4, wherein the driving maneuver graph includes vertices and wherein at least one vertex of the vertices of the driving maneuver graph is each assigned to the free areas, the change areas, and/or the lane keeping areas.

6. The method according to claim 5, wherein the vertices of the driving maneuver graph are preferably connected in pairs to an edge, in particular a directed edge, if a driving maneuver between the corresponding free areas ($B_f$), change areas, and/or lane keeping areas is possible, which are assigned to the vertices.

7. The method according to claim 3, wherein the driving maneuver graph includes vertices and wherein at least one vertex of the vertices of the driving maneuver graph is each assigned to the free areas, the change areas, and/or the lane keeping areas.

8. The method according to claim 7, wherein the vertices of the driving maneuver graph are preferably connected in pairs to an edge, in particular a directed edge, if a driving maneuver between the corresponding free areas, change areas, and/or lane keeping areas is possible, which are assigned to the vertices.

9. The method according to claim 7, wherein edges of the driving maneuver graph and/or the vertices each have at least one attribute and/or the driving maneuver graph has at least one global attribute.

10. The method according to claim 9, wherein the machine learning module is used to select the possible driving maneuver whose assigned sum of the attributes of the edges and/or the attributes of the vertices is minimal or maximal.

11. The method according to claim 3, wherein it is determined whether the motor vehicle can reach the free areas, the lane keeping areas, and/or the change areas, in particular wherein a current speed of the motor vehicle, a maximum deceleration of the motor vehicle, a maximum acceleration of the motor vehicle, and/or a speed limit are taken into account.

12. The method according to claim 1, wherein at least the current lane and/or the at least one further lane are or is transformed into a Frenet-Serret coordinate system.

13. A control device for a system for controlling a motor vehicle or for a motor vehicle, the control device being designed to carry out a method according to claim 1.

14. A method for controlling a motor vehicle traveling on a road in a current lane, the road having at least one further lane which is adjacent to the current lane of the motor vehicle, comprising the following steps:
- generating and/or receiving a driving maneuver graph containing information about at least two different possible driving maneuvers for the motor vehicle; and
- selecting one of the at least two possible driving maneuvers by means of a machine learning module which applies a machine learning method to the driving maneuver graph,
- wherein the driving maneuver graph provides information about free areas of the road, occupied areas of the road which are occupied by other road users, lane keeping areas of the road, in which a lane change between the two lanes is not possible, and/or change areas of the road, in which a lane change between the two lanes is possible,
- wherein at least one space-time polygon corresponding to the current lane, at least one space-time polygon corresponding to the at least one further lane, and at least one space-time polygon corresponding to the occupied areas is determined,
- wherein the space-time polygons corresponding to the free areas of the two lanes are determined by means of polygon clipping,
- wherein the driving maneuver graph is divided into a plurality of sub-areas by the occupied areas representing areas in the current lane and/or the at least one further lane that are occupied by the other road users, vertical dividing lines representing a change in occupancy of the current lane and/or the at least one further lane, and oblique dividing lines representing an extension of the occupied areas, wherein a gradient of the occupied areas corresponds to a speed of the other road users, and
- wherein the motor vehicle is controlled according to the selected driving maneuver and/or information is given to the driver on the basis of the selected driving maneuver.

15. The method according to claim 14, wherein it is determined whether the motor vehicle can reach the free areas, the lane keeping areas, and/or the change areas, in particular wherein a current speed of the motor vehicle, a maximum deceleration of the motor vehicle, a maximum acceleration of the motor vehicle, and/or a speed limit are taken into account.

* * * * *